(12) United States Patent
Kosuge et al.

(10) Patent No.: US 12,051,946 B2
(45) Date of Patent: Jul. 30, 2024

(54) ROTOR, MOTOR, AND ROTOR MANUFACTURING METHOD

(71) Applicant: NIDEC SANKYO CORPORATION, Nagano (JP)

(72) Inventors: Masahiro Kosuge, Nagano (JP); Masato Gomyo, Nagano (JP); Kazuma Yamamoto, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 434 days.

(21) Appl. No.: 17/427,088

(22) PCT Filed: Nov. 1, 2019

(86) PCT No.: PCT/JP2019/043052
§ 371 (c)(1),
(2) Date: Jul. 29, 2021

(87) PCT Pub. No.: WO2020/158083
PCT Pub. Date: Aug. 6, 2020

(65) Prior Publication Data
US 2022/0123614 A1  Apr. 21, 2022

(30) Foreign Application Priority Data
Jan. 31, 2019 (JP) ................ 2019-015586

(51) Int. Cl.
*H02K 1/28* (2006.01)
*H02K 1/2733* (2022.01)
(Continued)

(52) U.S. Cl.
CPC ............ *H02K 1/28* (2013.01); *H02K 1/2733* (2013.01); *H02K 15/03* (2013.01); *H02K 21/16* (2013.01)

(58) Field of Classification Search
CPC ........ H02K 1/28; H02K 1/2733; H02K 15/03; H02K 21/16
See application file for complete search history.

(56) References Cited

U.S. PATENT DOCUMENTS 4,115,716 A    9/1978  Ogasawala et al.
4,547,131 A *  10/1985 Riffe ............... F04B 39/127
                                        310/90
(Continued)

FOREIGN PATENT DOCUMENTS

FR       2821498    *  8/2002
JP       S5797354      6/1982
(Continued)

OTHER PUBLICATIONS

"Search Report of Europe Counterpart Application", issued on Oct. 4, 2022, pp. 1-8.
(Continued)

*Primary Examiner* — Ahmed Elnakib
(74) *Attorney, Agent, or Firm* — JCIPRNET

(57) ABSTRACT

In a rotor of a motor or the like, in order to suppress scattering of a part of a magnet provided around a rotating shaft, the rotor has a cylindrical magnet through which the rotating shaft passes, a first holder which covers the magnet from one side in an axial direction of the rotating shaft and a second holder which covers the magnet from the other side in the axial direction. The magnet is press-fitted into a first body portion of the first holder and a second body portion of the second holder, and a first end of the first body portion and a second end of the second body portion are joined by welding or the like. An inner diameter of the first end and the inner diameter of the second end are larger than an outer diameter of the magnet.

25 Claims, 13 Drawing Sheets

(51) Int. Cl.
*H02K 15/03* (2006.01)
*H02K 21/16* (2006.01)

(56) References Cited

U.S. PATENT DOCUMENTS

| | | | | |
|---|---|---|---|---|
| 4,742,259 | A * | 5/1988 | Schaefer | H02K 1/278 |
| | | | | 310/156.28 |
| 5,040,286 | A * | 8/1991 | Stark | H02K 1/278 |
| | | | | 310/156.28 |
| 5,121,605 | A * | 6/1992 | Oda | F01D 5/10 |
| | | | | 310/156.28 |
| 10,003,243 | B2 * | 6/2018 | Kawaguchi | H02K 1/278 |
| 2006/0202577 | A1 * | 9/2006 | Maekawa | F16C 17/107 |
| | | | | 310/90 |
| 2007/0138891 | A1 * | 6/2007 | Hurst | H02K 1/278 |
| | | | | 310/156.28 |
| 2011/0084564 | A1 | 4/2011 | Huang | |
| 2011/0304234 | A1 * | 12/2011 | Ramon | H02K 5/1672 |
| | | | | 310/156.21 |
| 2015/0052935 | A1 | 2/2015 | Aso et al. | |
| 2018/0097413 | A1 * | 4/2018 | Sun | H02K 1/28 |

FOREIGN PATENT DOCUMENTS

| | | |
|---|---|---|
| JP | S6392246 | 4/1988 |
| JP | H02241339 | 9/1990 |
| JP | H04183238 | 6/1992 |
| JP | H05146102 | 6/1993 |
| JP | 05244738 * | 9/1993 |
| JP | 2539053 * | 10/1996 |
| JP | 2006025509 | 1/2006 |
| JP | 2008289221 | 11/2008 |
| JP | 2015119517 | 6/2015 |
| JP | 2017158340 | 9/2017 |
| JP | 2017216760 | 12/2017 |

OTHER PUBLICATIONS

"Office Action of China Counterpart Application", issued on Mar. 31, 2023, with English translation thereof, pp. 1-29.
"International Search Report (Form PCT/ISA/210) of PCT/JP2019/043052," mailed on Jan. 21, 2020, with English translation thereof, pp. 1-4.
"Office Action of Japan Counterpart Application", issued on Aug. 8, 2023, with English translation thereof, pp. 1-6.
Zhang Yuzhong et al., "Micromotor Structural Technology", Harbin Institute of Technology Press, Jul. 1997, submit with Machine English translation, pp. 1-8.
"Office Action of China Counterpart Application", issued on Sep. 28, 2023, with English translation thereof, pp. 1-29.

* cited by examiner

ROTOR, MOTOR, AND ROTOR MANUFACTURING METHOD

CROSS-REFERENCE TO RELATED APPLICATION

This application is a 371 application of the international PCT application serial no. PCT/JP2019/043052, filed on Nov. 1, 2019, which claims the priority benefits of Japan application no. 2019-015586, filed on Jan. 31, 2019. The entirety of each of the above-mentioned patent applications is hereby incorporated by reference herein and made a part of this specification.

TECHNICAL FIELD

The present invention relates to a rotor, a motor, and a manufacturing method of a rotor.

BACKGROUND ART

An inner rotor type motor has a rotor and a stator disposed on an outer peripheral surface of the rotor, and the rotor has a magnet held on the outer peripheral surface of a rotating shaft (see Patent Literature 1). Here, when the rotor rotates, there is a concern that falling powders of the magnet will be scattered. Therefore, a structure in which a non-magnetic pipe is fitted to an outer side of the magnet has been proposed.

CITATION LIST

Patent Literature

Patent Literature 1: Japanese Unexamined Patent Application Publication No. H05-146102

SUMMARY OF THE INVENTION

Problems to be Solved by the Invention

However, there is a problem that it is not easy to fit a pipe around a permanent magnet extending in an axial direction.

In view of the above problem, an object of the present invention is to provide a rotor, a motor, and a manufacturing method of a rotor having a configuration suitable for suppressing scattering of a part of a magnet provided around a rotating shaft.

Means for Solving the Problem

In order to solve the above problem, an aspect of a rotor according to the present invention has: a rotating shaft; a magnet in a cylindrical shape, having a through hole through which the rotating shaft passes; a first holder, including: a first bottom plate portion in an annular shape, covering the magnet from one side in an axial direction of the rotating shaft, and a first body portion in a cylindrical shape, projecting from the first bottom plate portion to the other side in the axial direction and covering a first portion on the one side in an outer peripheral surface of the magnet; and a second holder, including: a second bottom plate portion in an annular shape, covering the magnet from the other side, and a second body portion in a cylindrical shape, projecting from the second bottom plate portion to the one side and covering a second portion on the other side in the outer peripheral surface of the magnet, in which the magnet is press-fitted into the first body portion and the second body portion; a first end, which is an end on the other side of the first body portion, and a second end, which is an end on the one side of the second body portion, are joined; and an inner diameter of the first end and an inner diameter of the second end are larger than an outer diameter of the magnet.

In the rotor according to the present invention, the first holder covering the first portion on the one side in the axial direction and the second holder covering the second portion on the other side in the axial direction in the outer peripheral surface of the magnet are provided. Therefore, even if the magnet is damaged when the rotor rotates at a high speed, scattering of fragments (a part of the magnet) can be suppressed by the first holder and the second holder. In addition, since the magnet is covered by the first holder and the second holder, the magnet can be covered more easily than a case where the magnet is covered by a single pipe. Further, the magnet is press-fitted into the first body portion of the first holder and the second body portion of the second holder, and since the inner diameter of the first end of the first body portion and the inner diameter of the second end of the second body portion are larger than the outer diameter of the magnet, press-fitting is easy and joining of the first end and the second end is easy.

In the rotor according to the present invention, such an aspect can be employed that, the first end includes a first flange portion curved to an outer side in a radial direction from the first body portion, and the second end includes a second flange portion curved to the outer side in the radial direction from the second body portion, and the first flange portion and the second flange portion are joined. According to such aspect, the first holder and the second holder can be manufactured by press work, and the joining of the first end and the second end is easy.

In the rotor according to the present invention, such an aspect can be employed that, the first flange portion and the second flange portion are joined by welding over an entire circumference. According to such aspect, since a gap is unlikely to be generated between the first flange portion and the second flange portion, scattering of falling powders (a part of the magnet) generated when the magnet is press-fitted into the first holder and the second holder can be suppressed.

In the rotor according to the present invention, such an aspect can be employed that, the first body portion and the second body portion are curved to an inner side in the radial direction at a middle portion in the axial direction. When the gap between the first flange portion and the second flange portion is narrowed by applying a load in a direction in which the first body portion and the second body portion get closer to each other in the axial direction so as to have a structure that the first flange portion and the second flange portion can be welded easily, the first body portion and the second body portion might be curved to the inner side in the radial direction at the middle portion in the axial direction. According to such aspect, the first holder and the second holder can hold the magnet more reliably.

In the rotor according to the present invention, such an aspect can be employed that, a space between the first flange portion and the second flange portion is filled by a molten portion during welding. According to such aspect, since a gap is unlikely to be generated between the first flange portion and the second flange portion, the scattering of falling powders from the magnet can be suppressed.

In the rotor according to the present invention, such an aspect can be employed that, a first support plate in an annular shape overlapping the first holder from the one side and a second support plate in an annular shape overlapping the second holder from the other side are fixed to the rotating shaft. According to such aspect, the first holder and the second holder can be fixed to the rotating shaft by the first support plate and the second support plate. Accordingly, thicknesses of the first bottom plate portion of the first holder and the second bottom plate portion of the second holder can be small. In addition, a rotational balance of the rotor can be adjusted by machining or the like to the first support plate and the second support plate.

In the rotor according to the present invention, such an aspect can be employed that, the first bottom plate portion and the first support plate are joined, and the second bottom plate portion and the second support plate are joined.

In another aspect of the rotor according to the present invention, such as aspect can be employed that, the rotor including: a rotating shaft; a magnet in a cylindrical shape, having a through hole through which the rotating shaft passes; a first holder, including: a first bottom plate portion in an annular shape, covering the magnet from the one side in the axial direction of the rotating shaft, and a first body portion in a cylindrical shape, projecting from the first bottom plate portion to the other side in the axial direction and covering an outer peripheral surface of the magnet; and a second holder in an annular shape, covering the magnet from the other side, in which the magnet is press-fitted into the first body portion; a first end, which is an end on the other side of the first body portion, and the second holder are joined; and an inner diameter of the first end is larger than an outer diameter of the magnet.

In the rotor according to the present invention, such an aspect can be employed that, the first end includes a first flange portion curved to an outer side in a radial direction from the first body portion, and the first flange portion and the second holder are joined.

In the rotor according to the present invention, such an aspect can be employed that, the first flange portion is elastically deformed to the one side by the contact with the second holder.

In the rotor of the present invention, such an aspect can be employed that, in the first flange portion, a middle portion in the radial direction is brought into contact with the second holder, and a portion on the outer side in the radial direction from the middle portion of the first flange portion is warped toward the one side.

In the rotor according to the present invention, such an aspect can be employed that, the first bottom plate portion includes: a circular region, located at a center side in the radial direction; and an annular region, connecting the circular region to the first body portion. The circular region is located on a side opposite to the second holder from the annular region.

In the rotor according to the present invention, such an aspect can be employed that, a space between the circular region and the annular region is a step portion.

In the rotor according to the present invention, such as aspect can be employed that, the first annular region is an inclined surface inclined diagonally to the first circular region.

In the rotor according to the present invention, such an aspect can be employed that, the magnet is a sintered magnet. In the present invention, high reliability can be obtained even when sintered magnets are used because the falling powders of the magnets hardly scatter.

The rotor according to the present invention is used for a motor together with a stator facing the rotor.

In a manufacturing method of a rotor according to the invention, in which the rotor including: a rotating shaft; a magnet in a cylindrical shape, having a through hole through which the rotating shaft passes; a first holder, including: a first bottom plate portion in an annular shape, covering the magnet from one side in an axial direction of the rotating shaft, and a first body portion in a cylindrical shape, projecting from the first bottom plate portion to the other side in the axial direction and covering a first portion on the one side in an outer peripheral surface of the magnet; and a second holder, including: a second bottom plate portion in an annular shape, covering the magnet from the other side, and a second body portion in a cylindrical shape, projecting from the second bottom plate portion to the one side and covering a second portion on the other side in the outer peripheral surface of the magnet; in the manufacturing method of the rotor, an inner diameter of the first body portion and the inner diameter of the second body portion are made smaller than an outer diameter of the magnet at least in a part of the axial direction, an inner diameter of a first end, which is an end on the other side of the first body portion, and an inner diameter of a second end, which is an end on the one side of the second body portion, are made larger than the outer diameter of the magnet. The manufacturing method of the rotor includes: a first step of fixing the first holder to the rotating shaft; a second step of press-fitting the first portion of the magnet into the first body portion; a third step of fixing the second holder to the rotating shaft so that the second portion of the magnet is press-fitted into the second body portion; and a fourth step of joining of the first end and the second end.

In the manufacturing method of the rotor according to the present invention, the first holder covering the first portion on one side in the axial direction and the second holder covering the second portion on the other side in the axial direction in the outer peripheral surface of the magnet are provided. Therefore, when the rotor rotates at a high speed, the scattering of a part of the magnet such as fragments of the magnet and falling powders and the like can be suppressed by the first holder and the second holder. In addition, since the magnet is covered by the first holder and the second holder, the magnet can be covered more easily than a case where the magnet is covered by a single pipe. Further, the magnet is press-fitted into the first body portion of the first holder and the second body portion of the second holder, and since the inner diameter of the first end of the first body portion and the inner diameter of the second end of the second body portion are larger than the outer diameter of the magnet, press-fitting is easy and joining of the first end and the second end is easy.

In the manufacturing method of the rotor according to the present invention, such an aspect can be employed that, the first end includes a first flange portion curved to an outer side in a radial direction from the first body portion; and the second end includes a second flange portion curved to the outer side in the radial direction from the second body portion; and in the fourth step the first flange portion and the second flange portion are joined. According to such aspect, the first holder and the second holder can be manufactured by press work, and the joining of the first end and the second end is easy.

In the manufacturing method of the rotor according to the present invention, such an aspect can be employed that, in the fourth step, the first flange portion and the second flange portion are joined by welding over an entire circumference. According to such aspect, since a gap is unlikely to be generated between the first flange portion and the second flange portion, scattering of falling powders (a part of the magnet) generated when the magnet is press-fitted into the first holder and the second holder can be suppressed.

In the manufacturing method of the rotor according to the present invention, such as aspect can be employed that, in the fourth step, a laser beam is emitted from a direction inclined diagonally to the axial direction, so as to join the first flange portion and the second flange portion by laser welding. According to such aspect, since the laser beam is hard to penetrate into the interior through a space between the first flange portion and the second flange portion, deterioration of the magnet can be suppressed.

In the manufacturing method of the rotor according to the present invention, such as aspect can be employed that, after the third step and before the fourth step, a load is applied in a direction in which the first body portion and the second body portion get close to each other in the axial direction, so as to narrow a gap between the first flange portion and the second flange portion. According to such aspect, joining of the first flange portion and the second flange portion is easy.

In the manufacturing method of the rotor according to the present invention, such as aspect can be employed that, in the fourth step, the first flange portion and the second flange portion are melted so that the space between the first flange portion and the second flange portion is filled. According to such aspect, even if a gap exists between the first flange portion and the second flange portion when the fourth step is executed, the gap can be filled by welding.

In the manufacturing method of the rotor according to the present invention, such as aspect can be employed that, when the fourth step is executed, the gap between the first flange portion and the second flange portion is narrower than a protruding dimension of the first flange portion from the first body portion to the outer side in the radial direction and a protruding dimension of the second flange portion from the second body portion to the outer side in the radial direction. According to such aspect, the gap between the first flange portion and the second flange portion can be filled easily by melting the first flange portion and the second flange portion.

In the manufacturing method of the rotor according to the present invention, such as aspect can be employed that, when the fourth step is executed, a gap between the first flange portion and the second flange portion is narrower than a thickness of the first flange portion and a thickness of the second flange portion. According to such aspect, the gap between the first flange portion and the second flange portion can be filled easily by melting the first flange portion and the second flange portion.

In the manufacturing method of the rotor according to the present invention, such an aspect can be employed that, in the first step, the first holder is fixed to the rotating shaft by fixing a first support plate in an annular shape overlapping the first holder from the one side to the rotating shaft; and in the third step, the second holder is fixed to the rotating shaft by fixing a second support plate in an annular shape overlapping the second holder from the other side to the rotating shaft. According to such aspect, the first holder and the second holder can be fixed to the rotating shaft by the first support plate and the second support plate. Accordingly, thicknesses of the first bottom plate portion of the first holder and the second bottom plate portion of the second holder can be small. In addition, a rotational balance of the rotor can be adjusted by machining or the like to the first support plate and the second support plate.

In the manufacturing method of the rotor according to the present invention, such an aspect can be employed that, the first step is executed in a state where the first support plate is joined to the first bottom plate portion, and the third step is executed in a state where the second support plate is joined to the second bottom plate portion.

In the manufacturing method of the rotor according to the present invention, such an aspect can be employed that, the first flange portion and the second flange portion are elastically deformed by applying a load in a direction in which the first body portion and the second body portion get close to each other in the axial direction, and the first flange portion and the second flange portion are brought into contact with each other over the entire circumference.

In the manufacturing method of the rotor according to the present invention, such an aspect can be employed that, when a load is applied in a direction in which the first body portion and the second body portion get close to each other in the axial direction, a distance between the first bottom plate portion and the second bottom plate portion is narrowed to a target value.

MODE FOR CARRYING OUT THE INVENTION

Figure 1:
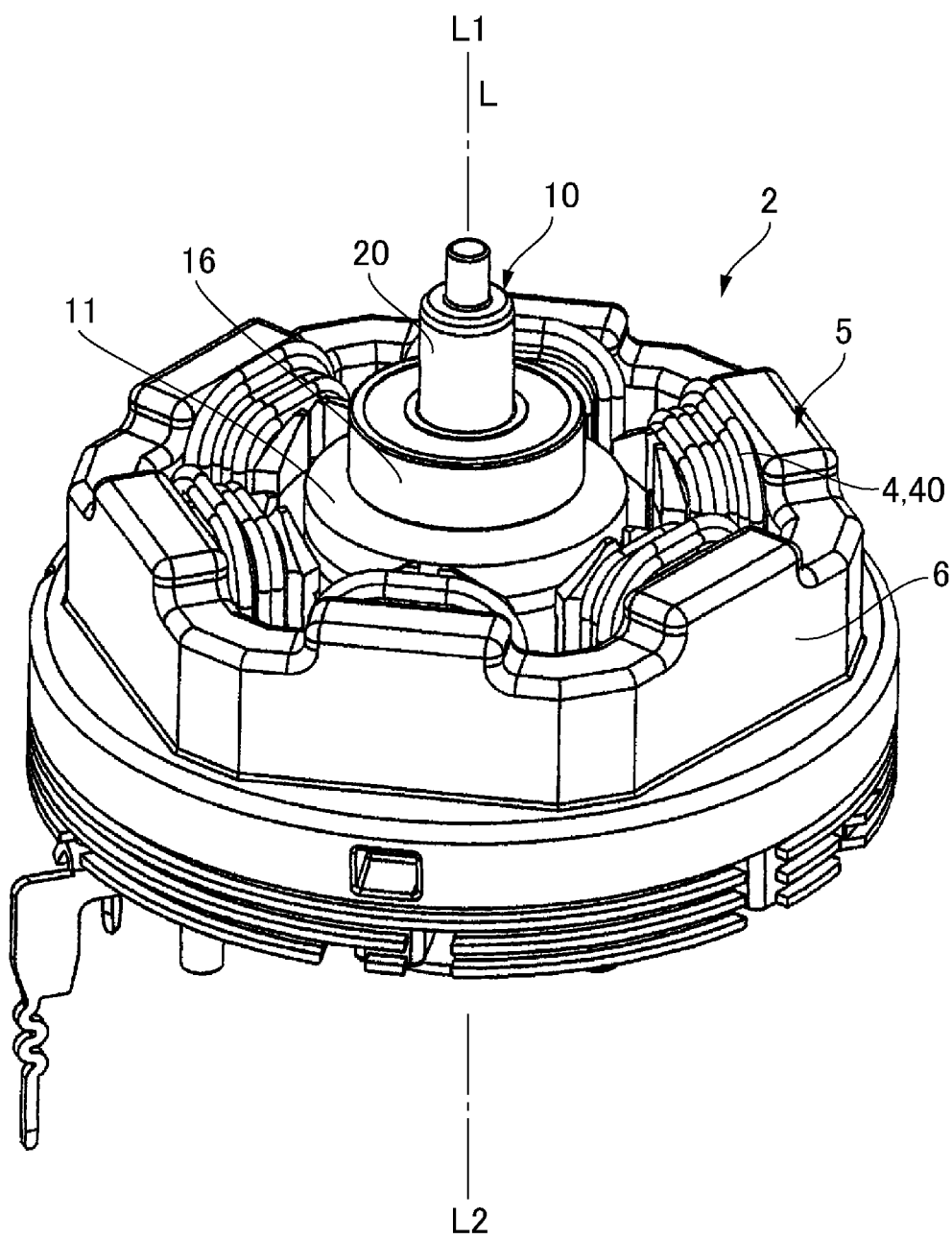
FIG. 1 is a perspective view of an essential part of a motor according to an embodiment of the present invention viewed from an output side.

With reference to the drawings, a motor 2 according to an embodiment of the present invention will be described. In this description, reference character L denotes an axial direction of the motor 2 (axial direction of the rotating shaft 20). In the embodiment described below, in the direction in which the axis L extends (axis L direction), one side L1 is an output side in which a rotating shaft 20 protrudes from a stator 5, and the other side L2 is an anti-output side opposite to the side in which the rotating shaft 20 protrudes from the stator 5. A direction perpendicular to the axis L is assumed to be the radial direction, and a direction around the axis L is the circumferential direction.

(Entire Configuration of Motor 2)

Figure 2:
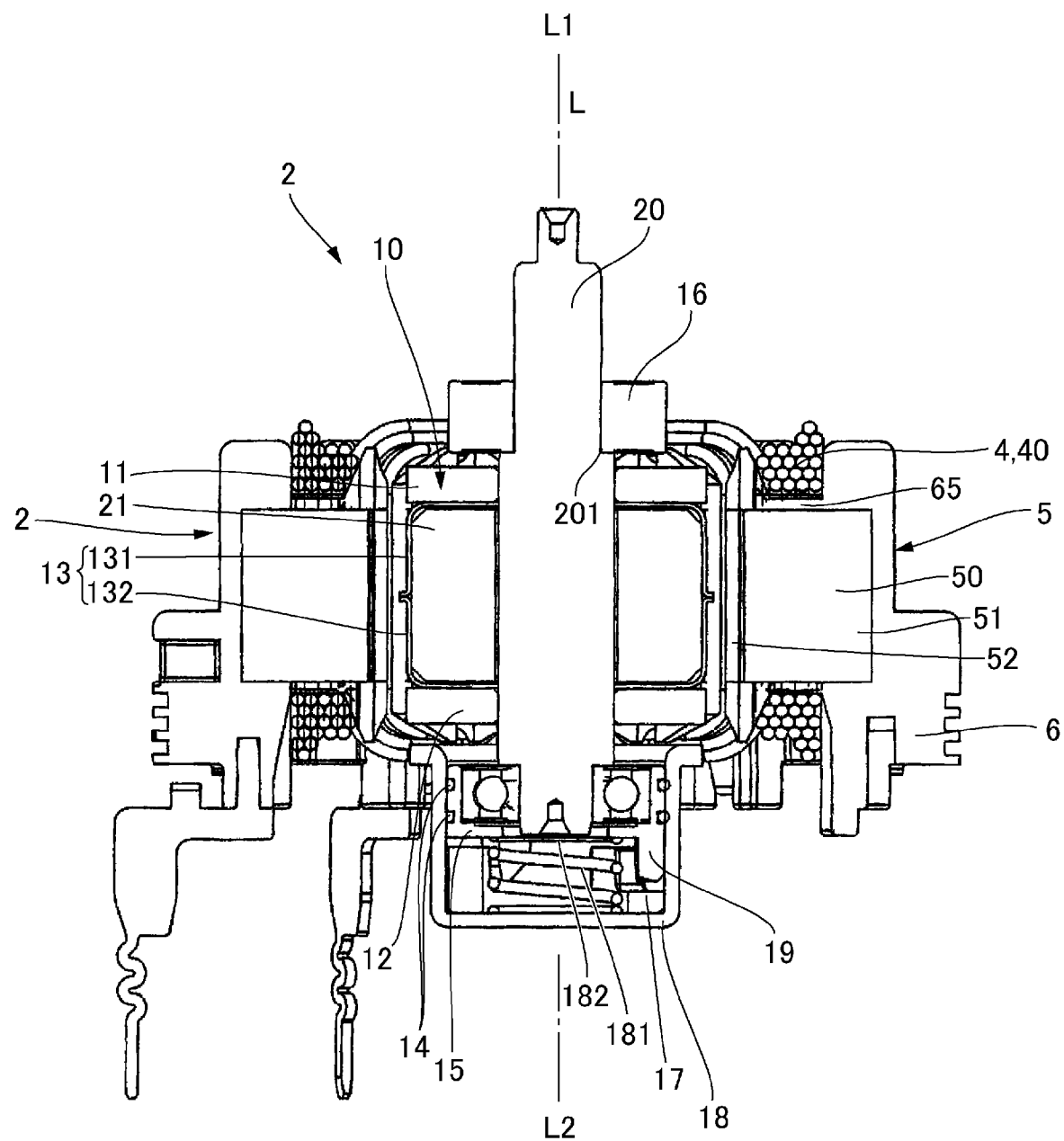
FIG. 2 is a cross-sectional view of the essential part of the motor shown in FIG. 1.

FIG. 1 is a perspective view of an essential part of the motor 2 according to an embodiment of the present invention viewed from the output side. FIG. 2 is a cross-sectional view of the essential part of the motor 2 shown in FIG. 1. The motor 2 shown in FIGS. 1 and 2 is a three-phase DC brushless motor and has a rotor 10 and the stator 5 disposed on the outer peripheral side of the rotor 10, and the motor 2 is used in a pump and the like with the stator 5 covered by a housing (not shown).

The housing retains a first bearing member 15 which rotatably supports the vicinity of an end of the anti-output side (the other side L2 in the axis L direction) of the rotating shaft 20 of the rotor 10. In addition, the housing retains a second bearing member 16 which rotatably supports a middle portion in the axis L direction of the rotating shaft 20. The first bearing member 15 is annular in shape and is brought into contact with a step portion 201 of the rotating shaft 20 from the output side (one side L1 in the axis L direction). Accordingly, movement of the rotating shaft 20 to the output side is regulated by the housing via the first bearing member 15. The end on the output side of the rotating shaft 20 protrudes from the housing.

The first bearing member 15 is a cylindrical ball bearing, and an outer ring of the first bearing member 15 is supported by the housing via a cylindrical holder 19. A space between the holder 19 and the housing is sealed by an annular sealing member 14. On the anti-output side with respect to the first bearing member 15, a cup-shaped holder 18 is retained in the housing, and a holder 17 is disposed inside the holder 18. On the inside of the holder 17, a compression coil spring 181 is disposed between an inner ring of the first bearing member 15 and a bottom part of the holder 18. The inner ring of the first bearing member 15 is supported from the anti-output side by the compression coil spring 181. A washer 182 is disposed between the inner ring of the first bearing member 15 and the compression coil spring 181.

The stator 5 has a stator core 50 made of a magnetic material, an insulator 6 made of an insulating resin or the like covering the stator core 50, and conductors 4 for constituting a coil. The stator core 50 is a laminated core formed by lamination of thin magnetic plates. Although detailed description will be omitted, the stator core 50 has a cylindrical core body 51 and a plurality of protruding poles 52 projecting to an inner side in the radial direction from the core body 51, and the plurality of protruding poles 52 are provided at equal angular intervals around the axis L. The stator core 50 is covered by the insulator 6 by insert molding. However, the end surface on the inner side in the radial direction of the protruding pole 52 is exposed from the insulator 6. The insulator 6 has a winding portion 65 covering the periphery of the protruding pole 52, and the conductors 4 are wound around the protruding pole 52 through the winding portion 65 to constitute coils 40 of each phase (U-phase, V-phase, and W-phase).

(Rotor 10)

Figure 3:
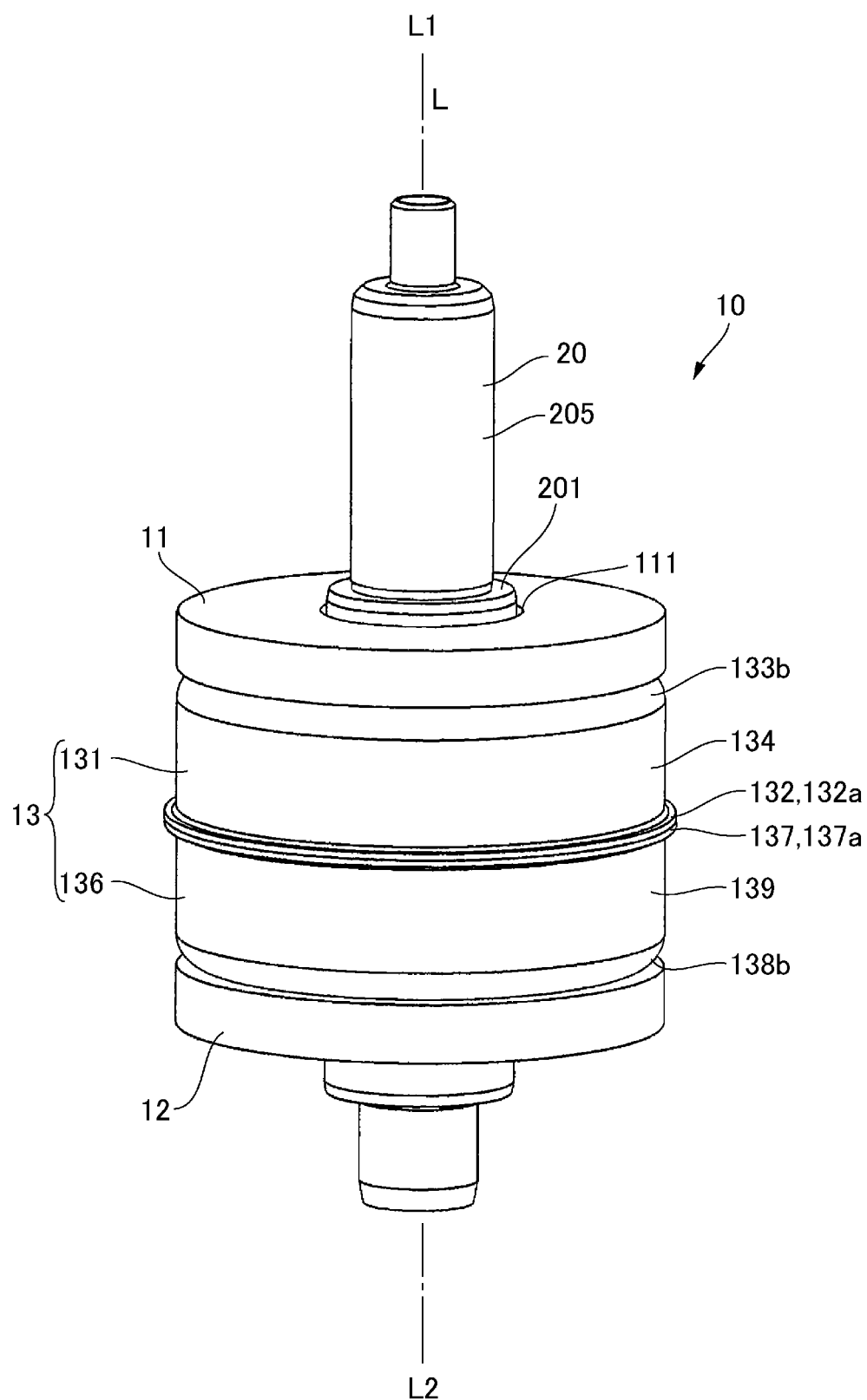
FIG. 3 is a perspective view of the rotor shown in FIG. 2 viewed from the output side.
Figure 4:
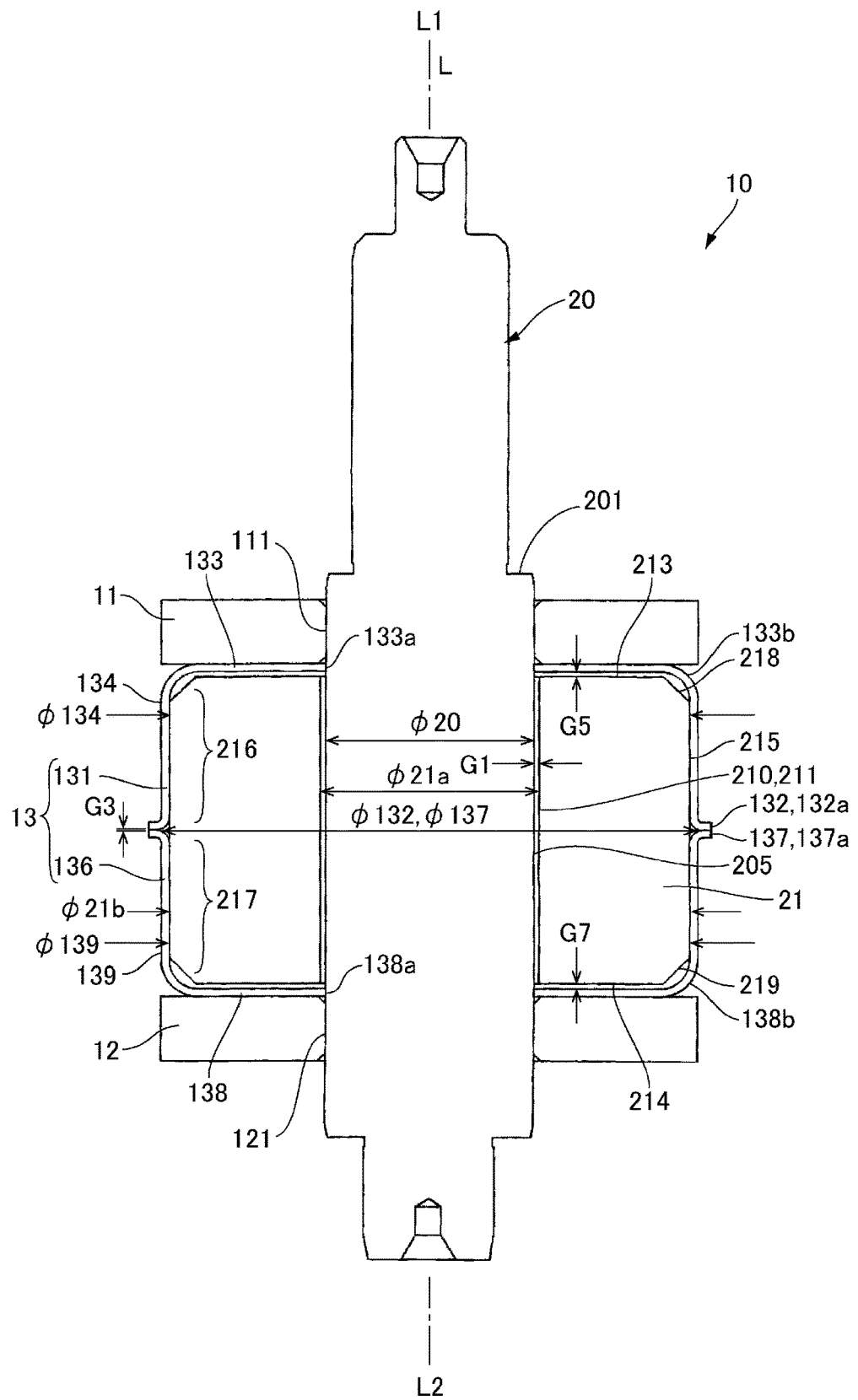
FIG. 4 is a cross-sectional view of the rotor shown in FIG. 3 when it is cut along an axis.
Figure 5:
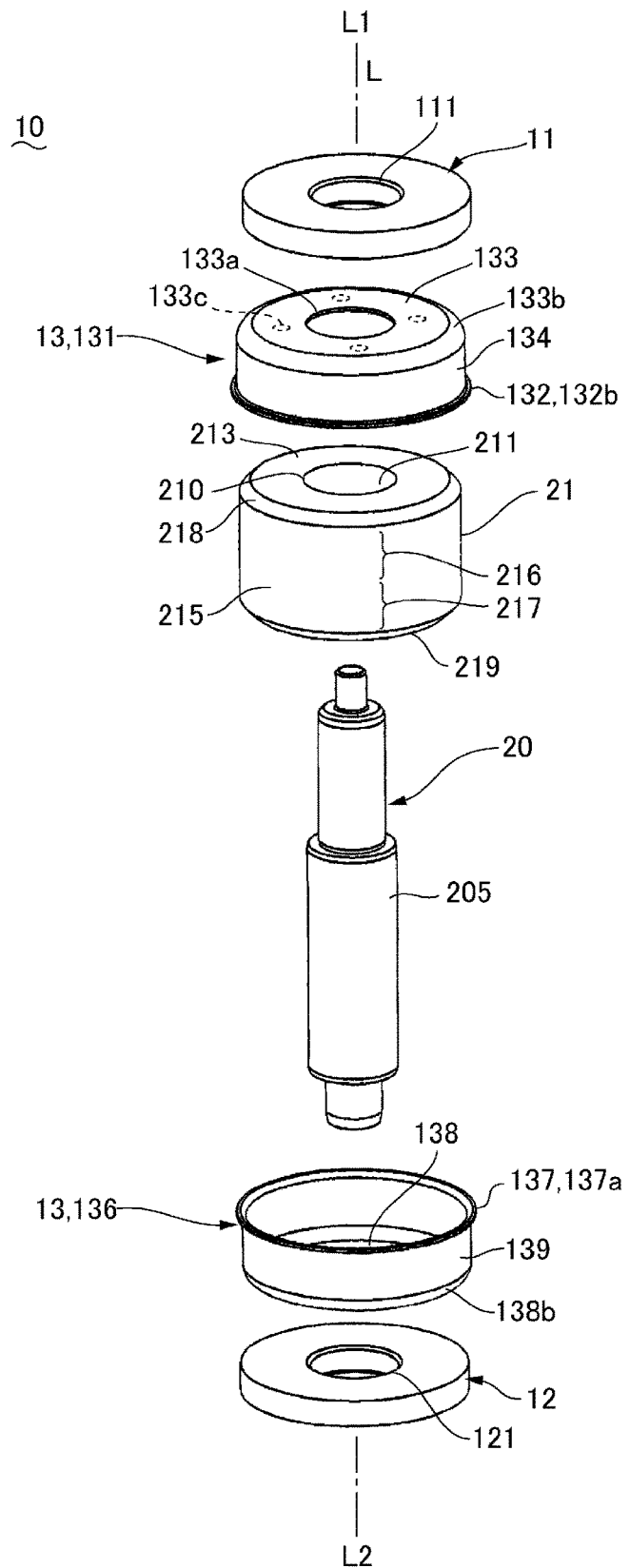
FIG. 5 is an explanatory view of a state in which a first support plate, a second support plate, and a second holder are removed from the state shown in FIG. 3.

FIG. 3 is a perspective view of the rotor 10 shown in FIG. 2 viewed from the one side L1 in the axis L direction. FIG. 4 is a cross-sectional view of the rotor 10 shown in FIG. 3 when it is cut along the axis L. FIG. 5 is an exploded perspective view of the rotor 10 shown in FIG. 3.

As shown in FIGS. 3, 4, and 5, the rotor 10 includes a rotating shaft 20, a magnet 21 disposed on an outer peripheral surface of the rotating shaft 20, and a magnet holder 13 fixed to the rotating shaft 20 so as to cover the outer peripheral surface of the magnet 21. The magnet 21 is cylindrical in shape with a through hole 210 formed through which the rotating shaft 20 passes, and is disposed coaxially with the rotating shaft 20. The magnet holder 13 fixes the magnet 21 to the rotating shaft 20 and prevents the magnet 21 from being damaged and scattered when the rotor 10 rotates.

An N-pole and an S-pole are alternately magnetized in the circumferential direction on an outer peripheral surface 215 of the magnet 21. In the present embodiment, the magnet 21 is an anisotropic magnet and is a sintered magnet made of ferrite, alnico, or rare earth based magnetic powders formed into a cylindrical shape under a magnetic field. A space between the outer peripheral surface 215 of the magnet 21 and a first end surface 213 of the one side L1 is a chamfered portion made of a slope 218, and a space between the outer peripheral surface 215 and a second end surface 214 of the other side L2 is a chamfered portion made of a slope 219. The rotating shaft 20 is a rod-shaped member with a perfectly circular outer peripheral surface 205, and is made of, for example, stainless steel. The magnet holder 13 is made of a metal member such as stainless steel.

The magnet holder 13 is made of a cup-shaped first holder 131 covering the magnet 21 from the one side L1 (output side) of the axis L direction of the rotating shaft 20, and a cup-shaped second holder 136 covering the magnet 21 from the other side L2 (anti-output side) of the axis L direction. The first holder 131 covers a first portion 216 of the outer peripheral surface 215 on the one side L1, and the second holder 136 covers a second portion 217 on the other side L2 of the outer peripheral surface 215 of the magnet 21.

The magnet holder 13 has a structure in which components of the same shape are arranged as the first holder 131 and the second holder 136 in opposite directions in the axis L direction. More specifically, the first holder 131 has an annular first bottom plate portion 133 having a shaft hole 133a into which the rotating shaft 20 is fitted by press fitting, and a cylindrical first body portion 134 extending from an outer edge of the first bottom plate portion 133 to the other side L2. The first bottom plate portion 133 covers the magnet 21 from the one side L1, and the first body portion 134 covers the first portion 216 from the outer side in the radial direction. The second holder 136 has an annular second bottom plate portion 138 having a shaft hole 138a into which the rotating shaft 20 is fitted by press fitting, and a cylindrical second body portion 139 extending from an outer edge of the second bottom plate portion 138 to the one side L1. The second bottom plate portion 138 covers the magnet 21 from the other side L2, and the second body portion 139 covers the second portion 217 from the outer side in the radial direction.

A first end 132, which is an end of the first body portion 134 on the other side L2 of the first holder 131, and a second end 137, which is an end of the second body portion 139 on the one side L1 of the second holder 136, are joined. In the present embodiment, the first end 132 and the second end 137 are joined over the entire circumference by welding.

A first support plate 11 is fixed to the rotating shaft 20 on the one side L1 with respect to the first holder 131, and a second support plate 12 is fixed to the second holder 136 on the other side L2. The first support plate 11 and the second support plate 12 have shaft holes 111 and 121 formed into which the rotating shaft 20 is fitted by press fitting. The first support plate 11 and the second support plate 12 are made of a metal member such as stainless steel. The first support plate 11 supports the first holder 131 from the one side L1 of the axis L direction, and the second support plate 12 supports the second holder 136 from the other side L2 of the axis L direction. Accordingly, thicknesses of the first bottom plate portion 133 of the first holder 131 and the second bottom plate portion 138 of the second holder 136 may be thin. Moreover, the rotational balance of the rotor 10 can be adjusted by machining or the like to the first support plate 11 and the second support plate 12.

In the present embodiment, the first bottom plate portion 133 of the first holder 131 and the first support plate 11 are joined by welding at a plurality of locations 133c shown in FIG. 5, and the second bottom plate portion 138 of the second holder 136 and the second support plate 12 are joined by welding at a plurality of locations in the same manner as the joining of the first bottom plate portion 133 of the first holder 131 and the first support plate 11.

In the motor 2 thus configured, an inner diameter ϕ 21a of the magnet 21 is larger than an outer diameter ϕ 20 of the rotating shaft 20. Thus, there is a gap G1 between an inner peripheral surface 211 of the magnet 21 and the outer peripheral surface of the rotating shaft 20. Moreover, there is a gap G5 between the first end surface 213 of the magnet 21 and the first bottom plate portion 133, and there is a gap G7 between the second end surface 214 of the magnet 21 and the second bottom plate portion 138. Accordingly, a load applied from the rotating shaft 20 to the magnet 21 can be reduced. Thus, deformation and damage of the magnet 21 can be suppressed.

(Detailed configuration of magnet holder 13, etc.)

In the rotor 10, in a state before the magnet 21 is disposed inside, an outer diameter ϕ 21b of the magnet 21 is larger than an inner diameter ϕ 134 of the first body portion 134 and an inner diameter ϕ 139 of the second body portion 139. Thus, the magnet 21 is fixed to the inside of the first body portion 134 and the inside of the second body portion 139 by press fitting. On the other hand, an inner diameter ϕ 132 of the first end 132 and an inner diameter ϕ 137 of the second end are larger than the outer diameter ϕ 21b of the magnet 21. Thus, a gap is formed between the first end 132 and the magnet 21 and between the second end 137 and the magnet 21.

In the present embodiment, the first end 132 includes a first flange portion 132a bent to an outer side in the radial direction from the first body portion 134, and the second end 137 includes a second flange portion 137a bent to the outer side in the radial direction from the second body portion 139, and the first flange portion 132a and the second flange portion 137a are joined. The first holder 131 and the second holder 136 are manufactured by press work, respectively. Thus, the first flange portion 132a is a portion curved to the outer side in the radial direction from the first body portion 134, and the second flange portion 137a is a portion curved to the outer side in the radial direction from the second body portion 139.

A first bent portion 133b between the first bottom plate portion 133 and the first body portion 134, and a second bent portion 138b between the second bottom plate portion 138 and the second body portion 139 are curved. On the other hand, a space between the outer peripheral surface 215 of the magnet 21 and the first end surface 213 on the one side L1 is a chamfered portion made of the slope 218, and a space between the outer peripheral surface 215 and the second end surface 214 on the other side L2 is a chamfered portion made of the slope 219. Thus, there is a gap between the first bent portion 133b of the first holder 131 and the slope 218 of the magnet 21, and there is a gap between the second bent portion 138b of the second holder 136 and the slope 219 of the magnet 21.

(Manufacturing method of rotor 10)

Figure 6:
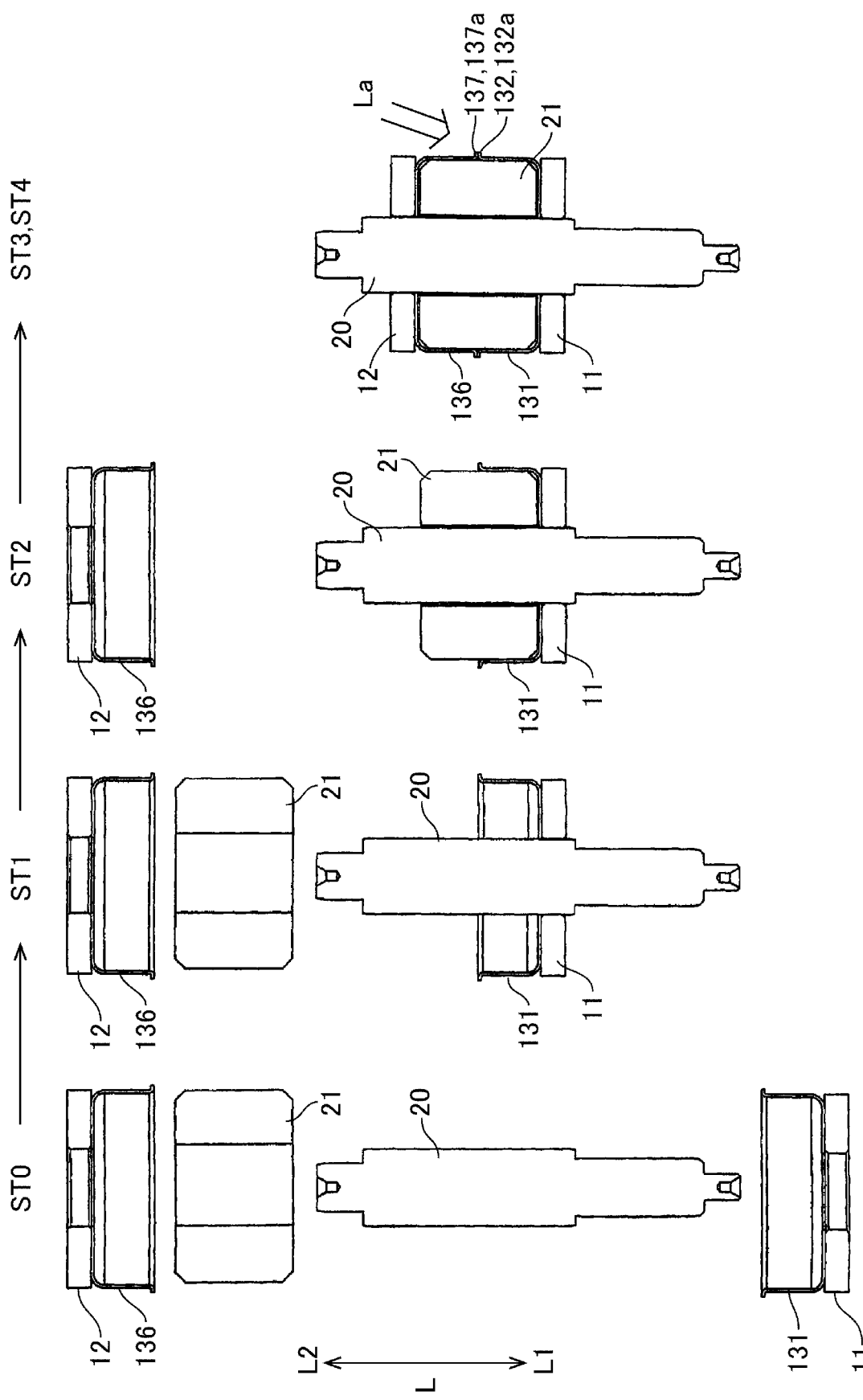
FIG. 6 is a cross-sectional view of the rotor when it is cut in a direction perpendicular to the axis at a position through the magnet shown in FIG. 3.

FIG. 6 is an explanatory view of a manufacturing method for the rotor 10 shown in FIG. 3. In FIG. 6, a state where the first holder 131 is disposed on the lower side, contrary to FIG. 4 and the like, is illustrated. In manufacturing of the rotor 10, the inner diameter ϕ 134 of the first body portion 134 of the first holder 131 and the inner diameter ϕ 139 of the second body portion 139 of the second holder 136 are made smaller than the outer diameter ϕ 21b of the magnet 21 in at least a part of the axis L direction, and the inner diameter ϕ 132 of the first end 132 of the first holder 131 and the inner diameter ϕ 137 of the second end 137 of the second holder 136 are made larger than the outer diameter ϕ 21b of the magnet 21.

In the present embodiment, first, in a pre-step ST0 shown in FIG. 6, the first bottom plate portion 133 of the first holder 131 and the first support plate 11 are joined by welding at a plurality of locations, and the second bottom plate portion 138 of the second holder 136 and the second support plate 12 are joined by welding at a plurality of locations.

Next, in a first step ST1, the first holder 131 is fixed to the rotating shaft 20. More specifically, in the first step ST1, the first holder 131 is fixed to the rotating shaft 20 by fixing the annular first support plate 11, which overlaps the first holder 131 from the one side L1, to the rotating shaft 20 by press-fitting. In the present embodiment, the first step ST1 is executed in a state where the first support plate 11 is joined to the first bottom plate portion 133.

Next, in the second step ST2, the first portion of the magnet 21 is press-fitted into the first body portion 134 of the first holder 131.

Next, in the third step ST3, the second holder 136 is fixed to the rotating shaft 20 so that the second portion 217 of the magnet 21 is press-fitted into the second body portion 139 of the second holder 136. More specifically, in the third step ST3, the second holder 136 is fixed to the rotating shaft 20 by fixing the annular second support plate 12, which overlaps the second holder 136 from the other side L2, to the rotating shaft 20. In the present embodiment, the third step ST3 is executed in a state where the second support plate 12 is joined to the second bottom plate portion 138.

Next, in the fourth step ST4, the first flange portion 132a (first end 132) of the first holder 131 and the second flange portion 137a (second end 137) of the second holder 136 are joined by welding. In the present embodiment, the first flange portion 132a and the second flange portion 137a are joined by laser welding by emitting a laser beam La from a direction diagonally inclined to the axis L direction.

(First Example of Controlling Gap G3)

Figure 7:
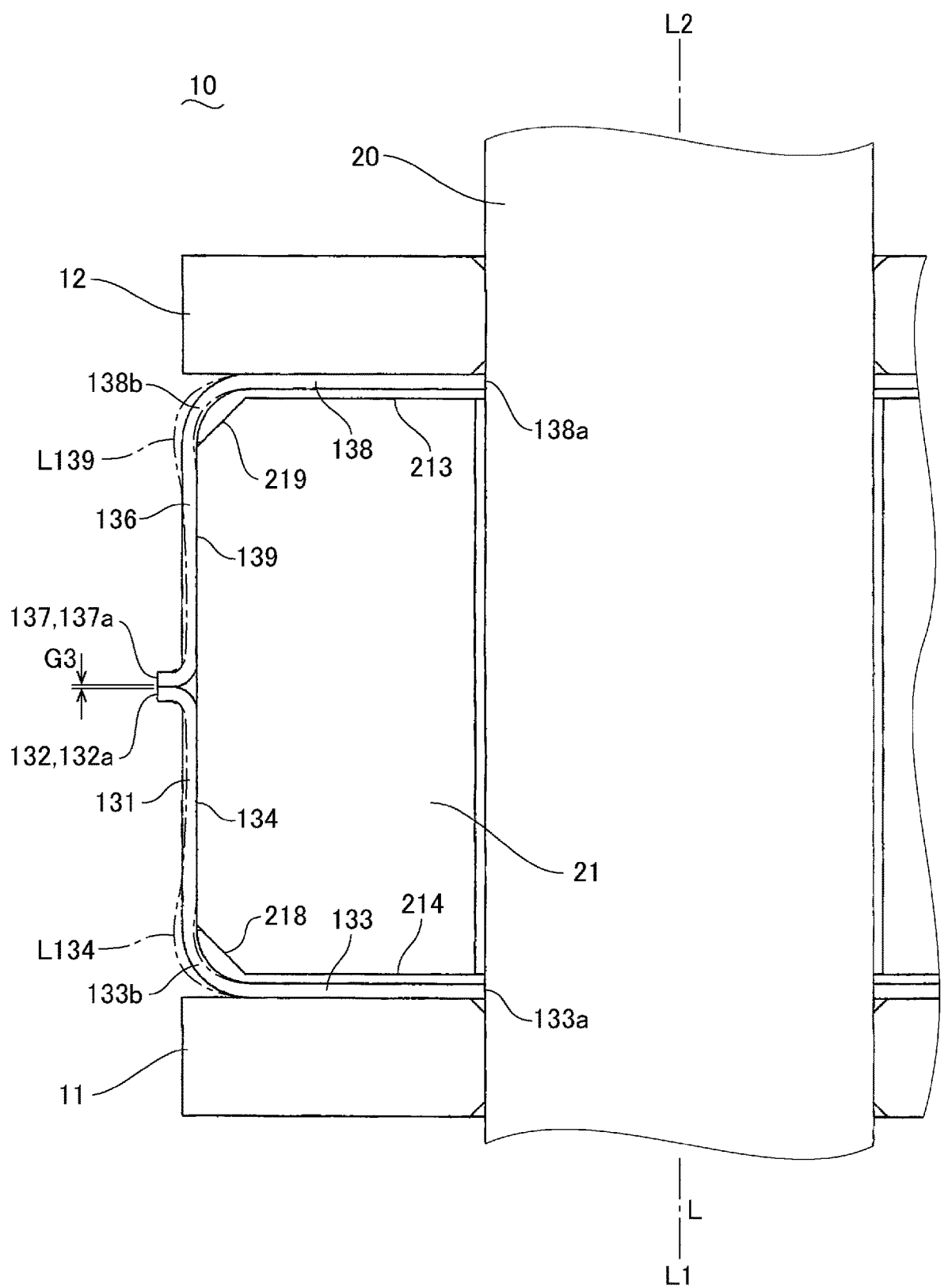
FIG. 7 is a schematic explanatory view of a shape and the like of a through hole of the magnet in the rotor shown in FIG. 5.

FIG. 7 is an explanatory view showing a state where the first flange portion 132a and the second flange portion 137a when the fourth step ST4 shown in FIG. 6 is executed. When the first flange portion 132a and the second flange portion 137a are to be welded in the fourth step ST4 shown in FIG. 6, if there is a large gap G3 between the first flange portion 132a and the second flange portion 137a, the gap cannot be filled by welding. Therefore, after the third step ST3 and before the fourth step ST4, a load in a direction in which the first body portion 134 and the second body portion 139 get close to each other is applied. More specifically, a load in the direction in which the first body portion 134 and the second body portion 139 get close to each other is applied through the first support plate 11 and the second support plate 12 so as to narrow the gap G3 between the first flange portion 132a and the second flange portion 137a. In that case, the first body portion 134 and the second body portion 139 are curved to the inner side in the radial direction at the middle portion in the axis L direction, as shown schematically by single-dotted chain lines L134 and L139 in FIG. 7.

(Second Example of Controlling Gap G3)

Figure 8:
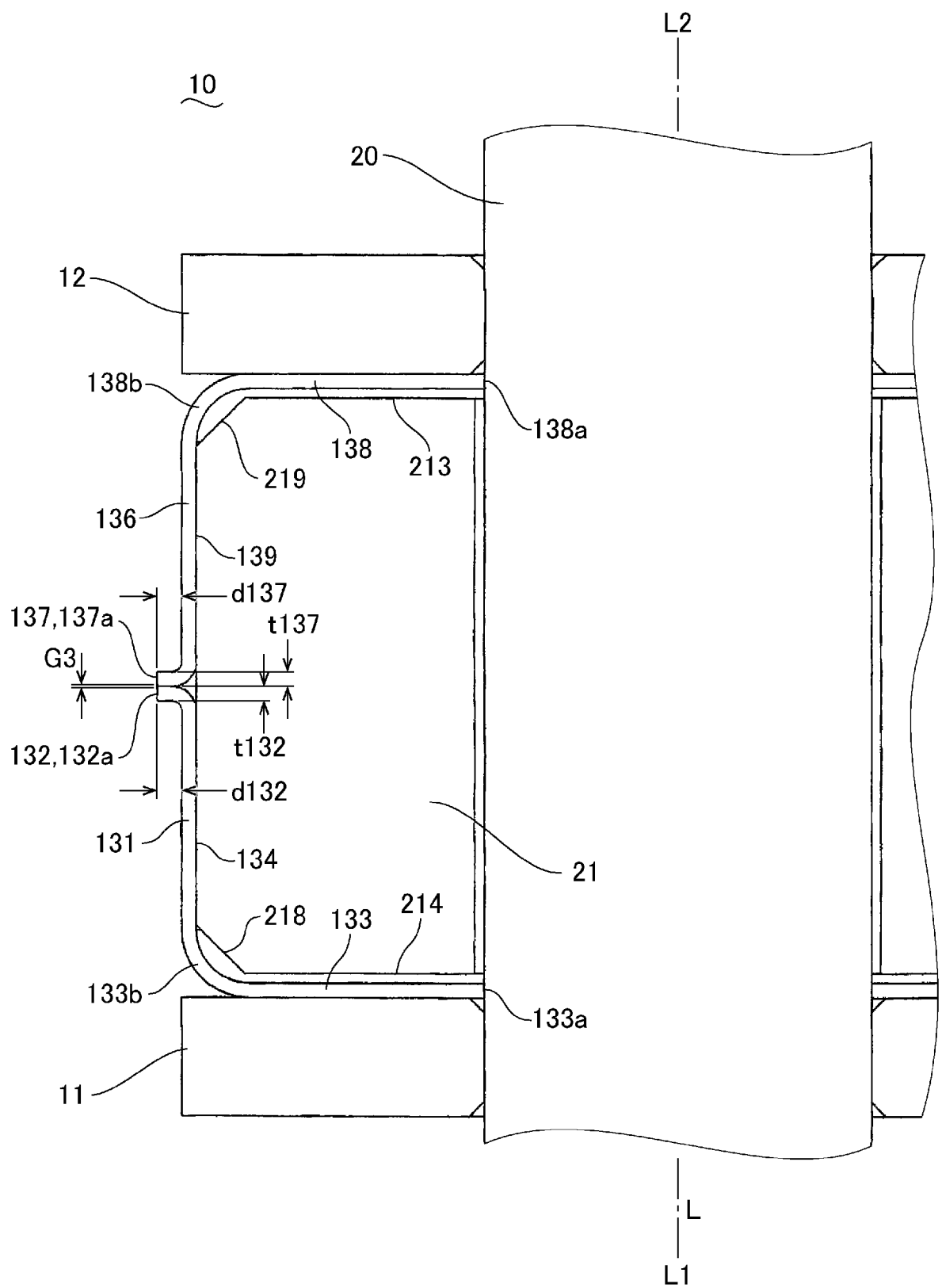
FIG. 8 is a schematic explanatory view of a position and the like of the through hole of the magnet in the rotor shown in FIG. 5.

FIG. 8 is an explanatory view showing a state where the first flange portion 132a and the second flange portion 137a when the fourth step ST4 shown in FIG. 6 is executed. When the first flange portion 132a and the second flange portion 137a are to be welded in the fourth step ST4 shown in FIG. 6, if there is a large gap G3 between the first flange portion 132a and the second flange portion 137a, the gap cannot be filled by welding. On the other hand, even if a load in the direction in which the first body portion 134 and the second body portion 139 get close to each other is applied through the first support plate 11 and the second support plate 12, the first holder 131 and the second holder 136 do not move due to a frictional force between the first support plate 11 and the rotating shaft 20 or the frictional force between the second support plate 12 and the rotating shaft 20, and the gap G3 cannot be narrowed in some cases.

Thus, the tolerances and the like of each component are controlled, and in each step described with reference to FIG. 6, the position of each member when it is press-fitted is controlled, and the gap G3 between the first flange portion 132a and the second flange portion 137a is narrowed when the fourth step ST4 is executed. For example, the gap G3 is made smaller than a protruding dimension d132 of the first flange portion 132a from the first body portion 134 of the first holder 131 to the outer side in the radial direction and a protruding dimension d137 of the second flange portion 137a from the second body portion 139 of the second holder 136 to the outer side in the radial direction. Moreover, the gap G3 is made smaller than a thickness t132 of the first flange portion 132a and a thickness t137 of the second flange portion 137a. For example, since the protruding dimensions d132 and d137 are 0.5 mm, the gap G3 is set to 0.05 mm or less.

Then, in the fourth step ST4, when the first flange portion 132a and the second flange portion 137a are to be laser-welded, the first flange portion 132a and the second flange portion 137a are melted, and the gap G3 is filled by the molten portion. Accordingly, the first flange portion 132a and the second flange portion 137a are melted more than necessary for joining, but the excess portion of the molten portion that protrudes from the gap G3 flows into the gap between the first flange portion 132a and the magnet 21 and into the gap from the second flange portion 137a and thus, they do not flow to the outside.

Main Advantages of Present Embodiment

As described above, on the motor 2 and the rotor 10 of the present embodiment, the first holder 131 covering the first portion 216 on the one side L1 in the axis L direction and the second holder 136 covering the second portion 217 on the other side L2 in the axis L direction in the outer peripheral surface 215 of the magnet 21 are provided. Thus, even if the magnet 21 is damaged when the rotor 10 rotates at a high speed, the scattering of the fragments (a part of the magnet 21) can be suppressed by the first holder 131 and the second holder 136. In addition, since the magnet 21 is covered by the first holder 131 and the second holder 136, the magnet 21 is covered more easily than a case where the magnet is covered by a single pipe. Moreover, the magnet 21 is press-fitted into the first body portion 134 of the first holder 131 and the second body portion 139 of the second holder 136, and the inner diameter $\phi$ 132 of the first end 132 of the first body portion 134 and the inner diameter $\phi$ 137 of the second end 137 of the second body portion 139 are larger than the outer diameter $\phi$ 21b of the magnet 21 and thus, the press-fitting is easier and joining of the first end 132 and the second end 137 is easier.

In addition, the first end 132 includes the first flange portion 132a curved to the outer side in the radial direction from the first body portion 134, and the second end 137 includes the second flange portion 137a curved to the outer side in the radial direction from the second body portion 139, and the first flange portion 132a and the second flange portion 137a are joined. Therefore, the first holder 131 and the second holder 136 can be manufactured by press work, and the first end 132 and the second end 137 can be joined easily.

In addition, since the first flange portion 132a and the second flange portion 137a are joined by welding over the entire circumference, a gap is hardly generated between the first flange portion 132a and the second flange portion 137a. Accordingly, scattering of the falling powders (a part of the magnet 21) generated when the magnet 21 is press-fitted into the first holder 131 and the second holder 136 can be suppressed. Therefore, intrusion of the falling powders into the motor bearings and the like can be suppressed.

Improvement Example 1 of the Embodiment of the Present Invention

Figure 9:
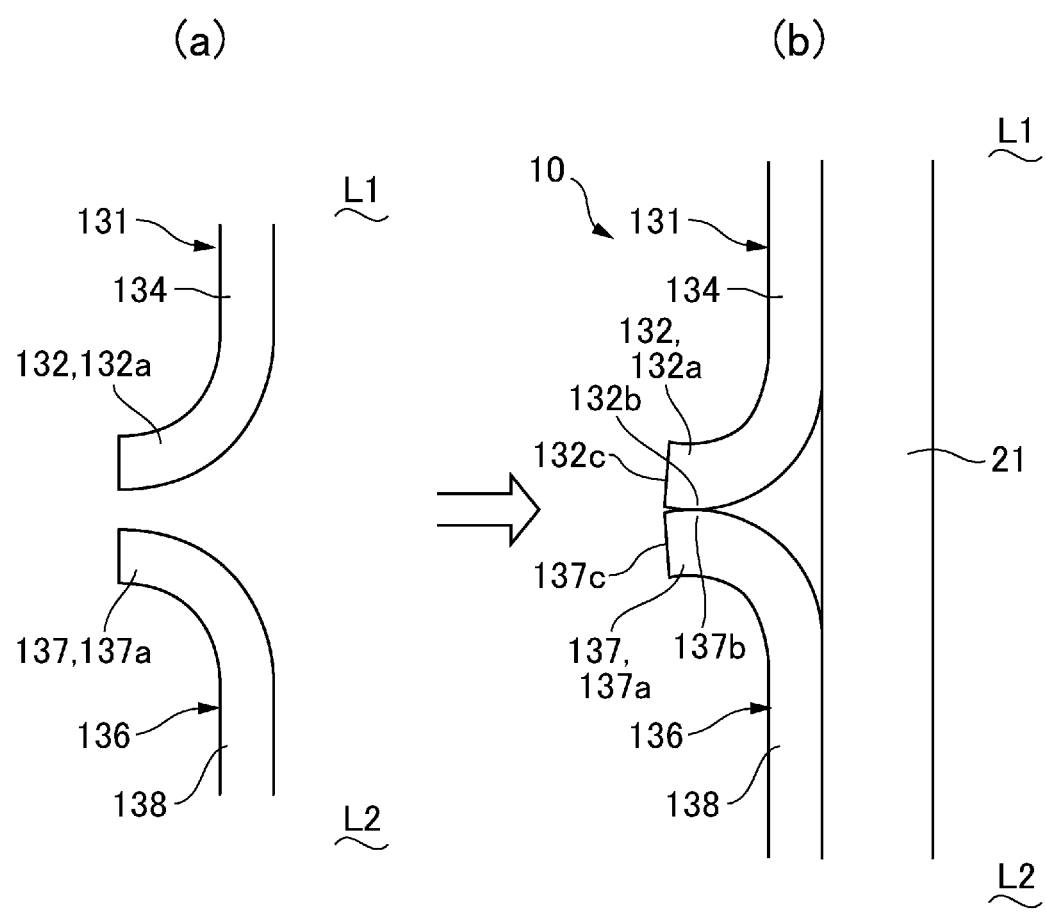
FIG. 9 is an explanatory view of the rotor according to an improvement example 1 of an embodiment of the present invention.

FIG. 9 is an explanatory view of a rotor according to an improvement example 1 of the embodiment of the present invention. FIG. 9 shows an enlarged view of a state (a) before the first holder 131 and the second holder 136 are brought into contact and a state (b) after the first holder 131 and the second holder 136 are brought into strong contact. Since the basic configuration of this example is similar to that of the embodiment described with reference to FIGS. 1 to 8, the same signs are given to the common parts and their description is omitted.

As shown in FIG. 9, in the state (a) before the first holder 131 and the second holder 136 are brought into contact with each other, the first flange portion 132a of the first holder 131 and the second flange portion 137a of the second holder 136 are curved with a large radius of curvature from the first body portion 134 and the second body portion 139, respectively. For example, if the radiuses of curvature of the first flange portion 132a and the second flange portion 137a are set to 0.5 mm, the springiness of the first flange portion 132a and the second flange portion 137a is not sufficient and thus, in this embodiment, the radiuses of curvature of the first flange portion 132a and the second flange portion 137a are increased to 0.75 mm.

Thus, the first flange portion 132a and the second flange portion 137a have springiness capable of elastic deformation in directions of separating from each other, respectively. Accordingly, even when the shape accuracy or the like of the first flange portion 132a and the second flange portion 137a varies in the circumferential direction, as shown in FIG. 6, after the first flange portion 132a and the second flange portion 137a are brought into contact with each other by applying a load such that the first body portion 134 and the second body portion 139 get close to each other in the axis L direction, in the state (b) in which the first flange portion 132a and the second flange portion 137a are further pushed in by 0.2 mm, the first flange portion 132a and the second flange portion 137a are elastically deformed, and the first flange portion 132a and the second flange portion 137a are brought into contact with each other over the entire circumference.

For example, in the first flange portion 132a, a middle portion 132b in the radial direction is brought into contact with the second flange portion 137a of the second holder 136, and a tip end portion 132c on the outer side in the radial direction from the middle portion 132b of the first flange portion 132a is warped toward the one side L1 in the axis L direction. In addition, in the second flange portion 137a, a middle portion 137b in the radial direction is brought into contact with the first flange portion 132a of the first holder 131, and a tip end portion 137c on the outer side in the radial direction from the middle portion 137b of the second flange portion 137a is warped toward the other side L2 in the axis L direction. Therefore, regardless of whether or not the middle portions in the axis L direction of the first body portion 134 and the second body portion 139 are curved to the inner side in the radial direction due to the load in the axis L direction (see FIG. 7), the first flange portion 132a and the second flange portion 137a are brought into contact with each other over the entire circumference, so that joining by welding or the like is easy.

When a load in a direction in which the first body portion 134 and the second body portion 139 get close to each other in the axis L direction is applied, the first flange portion 132a and the second flange portion 137a can be brought into contact with each other over the entire circumference by narrowing the distance between the first bottom plate portion 133 and the second bottom plate portion 138 shown in FIG. 4 to a target value. In the present embodiment, as described with reference to FIG. 6, since the first bottom plate portion 133 of the first holder 131 and the first support plate 11 are fixed and the second bottom plate portion 138 of the second holder 136 and the second support plate 12 are fixed, when a load in the direction in which the first body portion 134 and the second body portion 139 get close to each other in the axis L direction is applied, the first flange portion 132a and the second flange portion 137a can be brought into contact with each other over the entire circumference by narrowing the distance between the first support plate 11 and the second support plate 12 to the target value.

Improvement Example 2 of the Embodiment of the Present Invention

Figure 10:
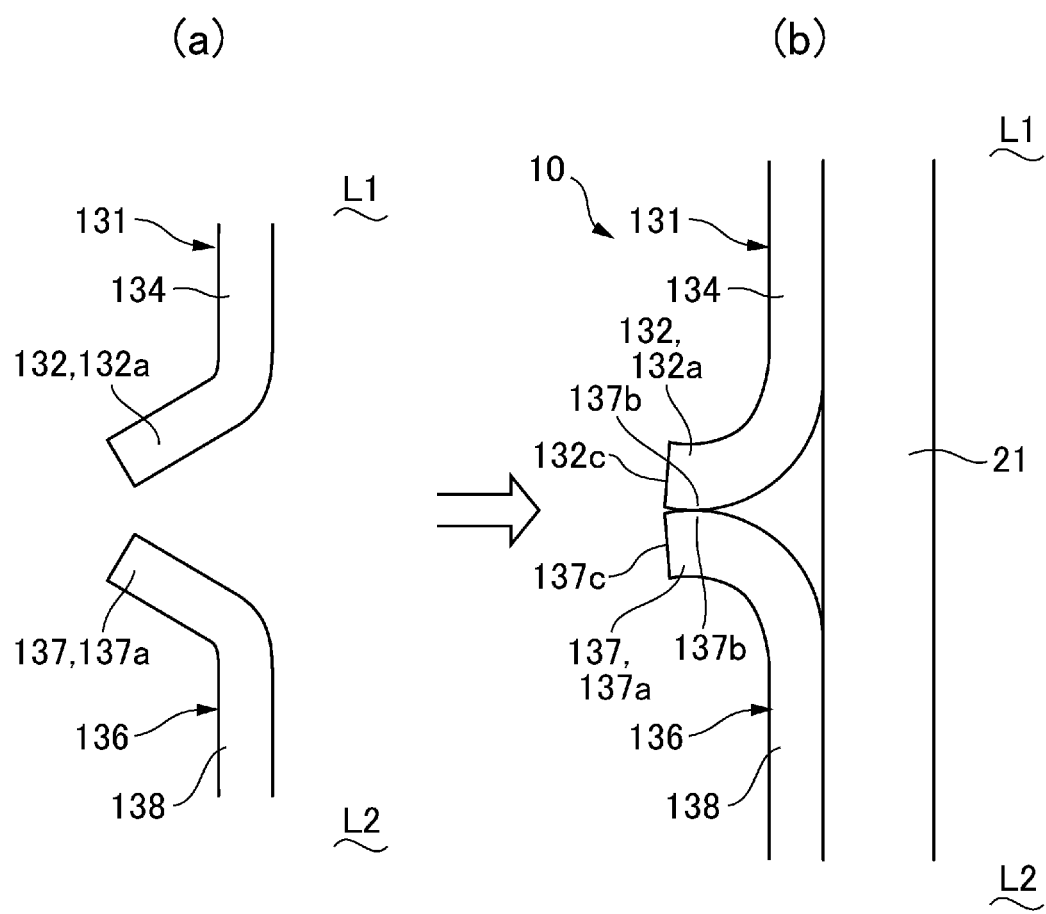
FIG. 10 is an explanatory view of the rotor according to an improvement example 2 of the embodiment of the present invention.

FIG. 10 is an explanatory view of a rotor according to the improvement example 1 of the embodiment of the present invention. FIG. 10 shows an enlarged view of the state (a) before the first holder 131 and the second holder 136 are brought into contact with each other and the state (b) after the first holder 131 and the second holder 136 are brought into strong contact. Since the basic configuration of this example is similar to that of the embodiment described with reference to FIGS. 1 to 8, the same signs are given to the common parts and their description is omitted.

As shown in FIG. 10, in the state (a) before the first holder 131 and the second holder 136 are brought into contact with each other, the first flange portion 132a of the first holder 131 and the second flange portion 137a of the second holder 136 are bent so as to form a large angle with respect to the first body portion 134 and the second body portion 139, respectively. For example, the first flange portion 132a and the second flange portion 137a are bent so as to form an angle of more than 45° and less than 90° with respect to the first body portion 134 and the second body portion 139.

Thus, the first flange portion 132a and the second flange portion 137a have springiness capable of elastic deformation in directions of separating from each other, respectively. Accordingly, even when the shape accuracy or the like of the first flange portion 132a and the second flange portion 137a varies in the circumferential direction, as shown in FIG. 6, after the first flange portion 132a and the second flange portion 137a are brought into contact with each other by applying a load such that the first body portion 134 and the second body portion 139 get close to each other in the axis L direction, in the state (b) in which the first flange portion 132a and the second flange portion 137a are further pushed in by 0.2 mm, the first flange portion 132a and the second flange portion 137a are elastically deformed, and the first flange portion 132a and the second flange portion 137a are brought into contact with each other over the entire circumference.

For example, in the first flange portion 132a, the middle portion 132b in the radial direction is brought into contact with the second flange portion 137a of the second holder 136, and the tip end portion 132c on the outer side in the radial direction from the middle portion 132b of the first flange portion 132a is warped toward the one side L1 in the axis L direction. In addition, in the second flange portion 137a, the middle portion 137b in the radial direction is brought into contact with the first flange portion 132a of the first holder 131, and the tip end portion 137c on the outer side in the radial direction from the middle portion 137b of the second flange portion 137a is warped toward the other side L2 in the axis L direction. Therefore, similarly to the aspect shown in FIG. 9, the first flange portion 132a and the second flange portion 137a are in contact with each other over the entire circumference, so that joining by welding or the like is easy.

Improvement Example 3 of the Embodiment of the Present Invention

Figure 11:
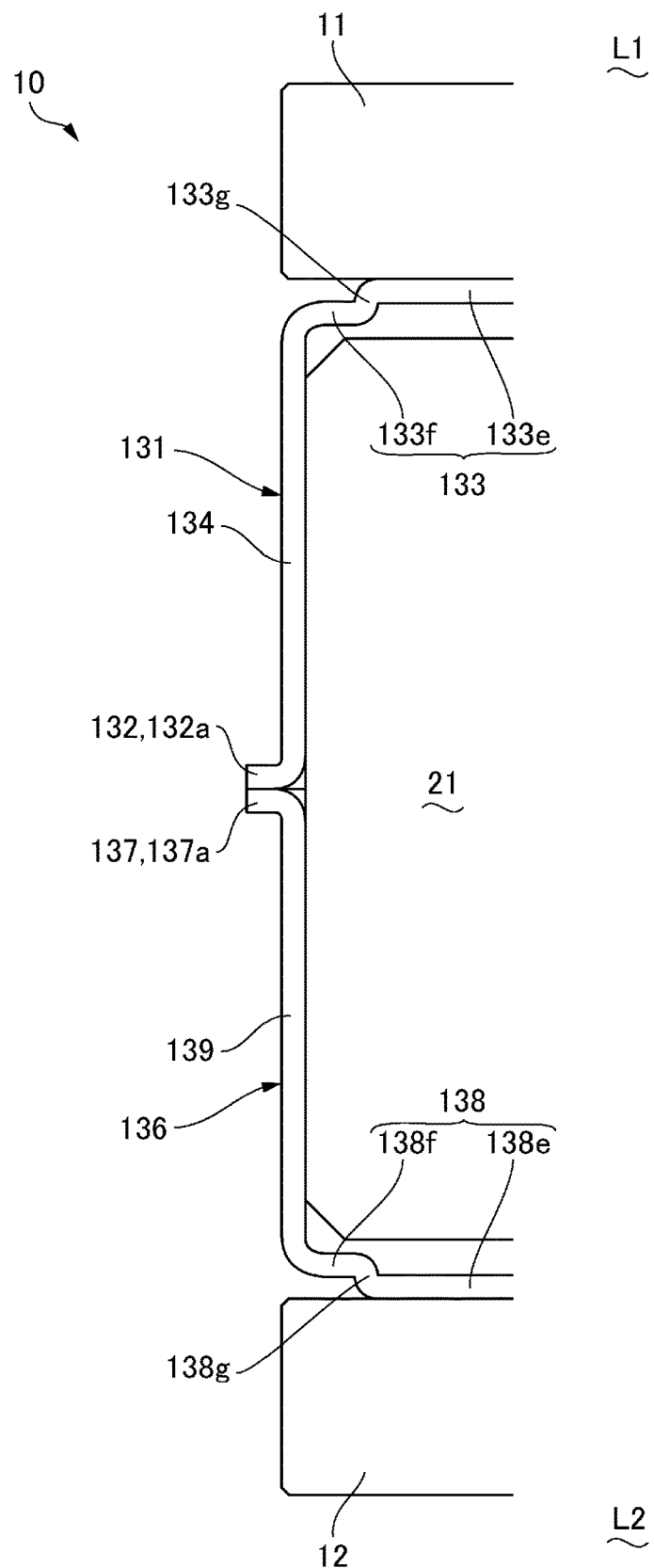
FIG. 11 is an explanatory view of the rotor according to an improvement example 3 of the embodiment of the present invention.

FIG. 11 is an explanatory view of a rotor according to an improved example 3 of the embodiment of the present invention. FIG. 11 shows the state in which the first holder 131 and the second holder 136 are in contact with each other. Since the basic configuration of this example is similar to that of the embodiment described with reference to FIGS. 1 to 8, the same signs are given to the common parts and their description is omitted.

As shown in FIG. 11, when the first holder 131 and the second holder 136 are to be brought into contact with each other, in the present embodiment, the first flange portion 132a and the second flange portion 137a are brought into contact with each other over the entire circumferences by narrowing the distance between the first bottom plate portion 133 and the second bottom plate portion 138 to a target value. In the present embodiment, since the first bottom plate portion 133 of the first holder 131 is fixed to the first support plate 11 and the second bottom plate portion 138 of the second holder 136 is fixed to the second support plate 12, when a load in a direction in which the first body portion 134 and the second body portion 139 get close to each other in the axis L direction is applied, the distance between the first support plate 11 and the second support plate 12 is narrowed to the target value.

In the present embodiment, as shown below, after the first flange portion 132a and the second flange portion 137a are brought into contact with each other, the load applied until the distance between the first bottom plate portion 133 and the second bottom plate portion 138 (the distance between the first support plate 11 and the second support plate 12) reaches the target value is absorbed by deformation of the first bottom plate portion 133 and the second bottom plate portion 138.

More specifically, the first bottom plate portion 133 includes a circular region 133e located at the center side of the radial direction and an annular region 133f connecting the circular region 133e and the first body portion 134, and the circular region 133e is located on the side opposite to the second holder 136 from the annular region 133f. Accordingly, the first support plate 11 is joined to the circular region 133e. In the present embodiment, a space between the circular region 133e and the annular region 133f is a step portion 133g. Accordingly, after the first flange portion 132a and the second flange portion 137a are brought into contact with each other, the load applied until the distance between the first bottom plate portion 133 and the second bottom plate portion 138 (the distance between the first support plate 11 and the second support plate 12) reaches the target value can be absorbed by the deformation of the step portion 133g.

The second bottom plate portion 138 includes a circular region 138e located at the center side of the radial direction and an annular region 138f connecting the circular region 138e and the second body portion 139, and the circular region 138e is located on the side opposite to the first holder 131 from the annular region 138f. Accordingly, the second support plate 12 is joined to the circular region 138e. In the present embodiment, the space between the circular region 138e and the annular region 138f is a step portion 138g. Accordingly, after the first flange portion 132a and the second flange portion 137a are brought into contact with each other, the load applied until the distance between the first bottom plate portion 133 and the second bottom plate portion 138 (the distance between the first support plate 11 and the second support plate 12) reaches the target value can be absorbed by the deformation of the step portion 138g.

Improvement Example 4 of the Embodiment of the Present Invention

Figure 12:
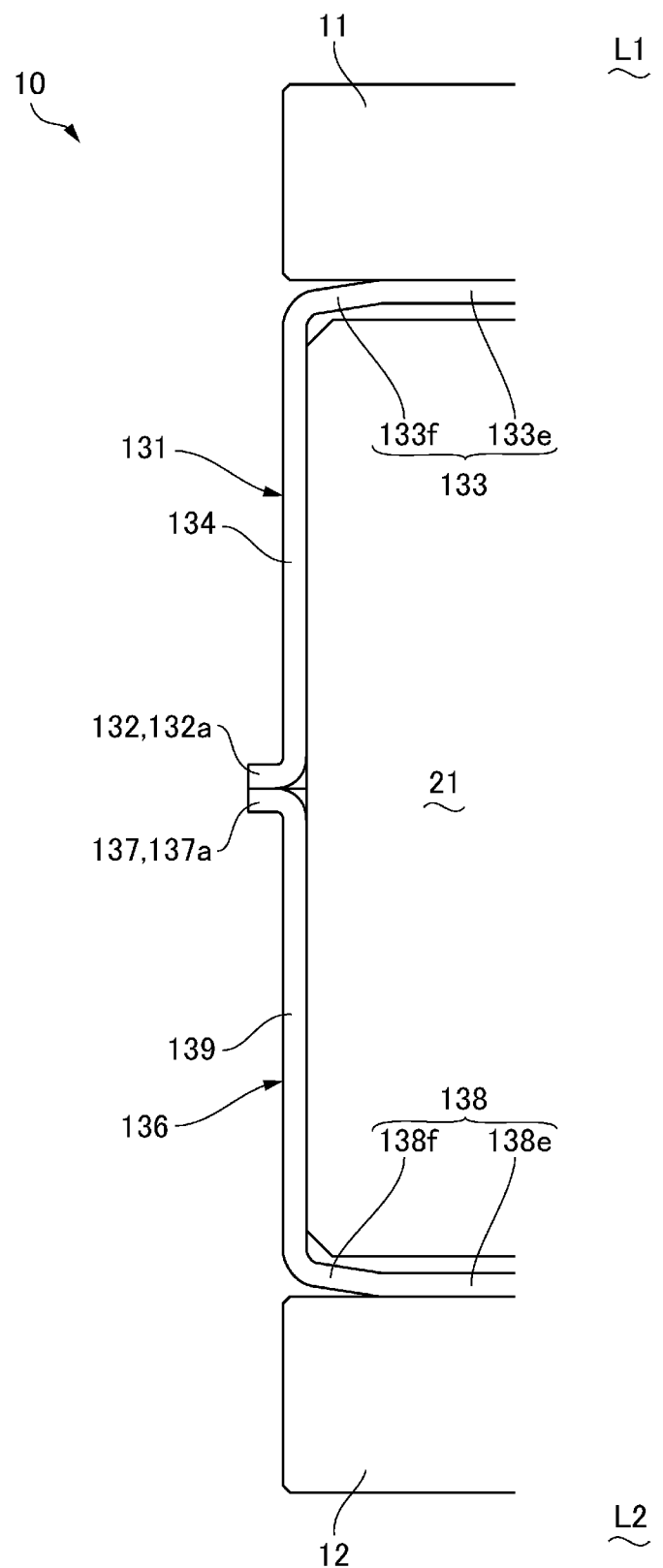
FIG. 12 is an explanatory view of the rotor according to an improvement example 4 of the embodiment of the present invention.

FIG. 12 is an explanatory view pf a rotor according to an improvement example 4 of the embodiment of the present invention. FIG. 12 shows the state in which the first holder 131 and the second holder 136 are in contact with each other. Since the basic configuration of this example is similar to that of the embodiment described with reference to FIGS. 1 to 8, the same signs are given to the common parts and their description is omitted.

As shown in FIG. 12, when the first holder 131 and the second holder 136 are brought into contact with each other, in the present embodiment, similarly to the improvement example 3, the first flange portion 132a and the second flange portion 137a are brought into contact with each other over the entire circumference by narrowing the distance between the first bottom plate portion 133 and the second bottom plate portion 138 to a target value. In the present embodiment, since the first bottom plate portion 133 of the first holder 131 is fixed to the first support plate 11 and the second bottom plate portion 138 of the second holder 136 is fixed to the second support plate 12, when a load in a direction in which the first body portion 134 and the second body portion 139 get close to each other in the axis L direction is applied, the distance between the first support plate 11 and the second support plate 12 is narrowed to the target value.

In the present embodiment, as shown below, after the first flange portion 132a and the second flange portion 137a are brought into contact with each other, the load applied until the distance between the first bottom plate portion 133 and the second bottom plate portion 138 (the distance between the first support plate 11 and the second support plate 12) reaches the target value is absorbed by the deformation of the first bottom plate portion 133 and the second bottom plate portion 138.

More specifically, the first bottom plate portion 133 includes the circular region 133e located at the center side of the radial direction and the annular region 133f connecting the circular region 133e and the first body portion 134, and the circular region 133e is located on the side opposite to the second holder 136 from the annular region 133f. Accordingly, the first support plate 11 is joined to the circular region 133e. In the present embodiment, the annular region 133f is an inclined surface. Accordingly, after the first flange portion 132a and the second flange portion 137a are brought into contact with each other, the load applied until the distance between the first bottom plate portion 133 and the second bottom plate portion 138 (the distance between the first support plate 11 and the second support plate 12) reaches the target value can be absorbed by the deformation of the annular region 133f.

The second bottom plate portion 138 includes the circular region 138e located at the center side of the radial direction and the annular region 138f connecting the circular region 138e and the second body portion 139, and the circular region 138e is located on the side opposite to the first holder 131 from the annular region 138f. Accordingly, the second support plate 12 is joined to the circular region 138e. In the present embodiment, the annular region 138f is an inclined surface. Accordingly, after the first flange portion 132a and the second flange portion 137a are brought into contact with each other, the load applied until the distance between the first bottom plate portion 133 and the second bottom plate portion 138 (the distance between the first support plate 11 and the second support plate 12) reaches the target value can be absorbed by the deformation of the annular region 138f.

Another Embodiment

Figure 13:
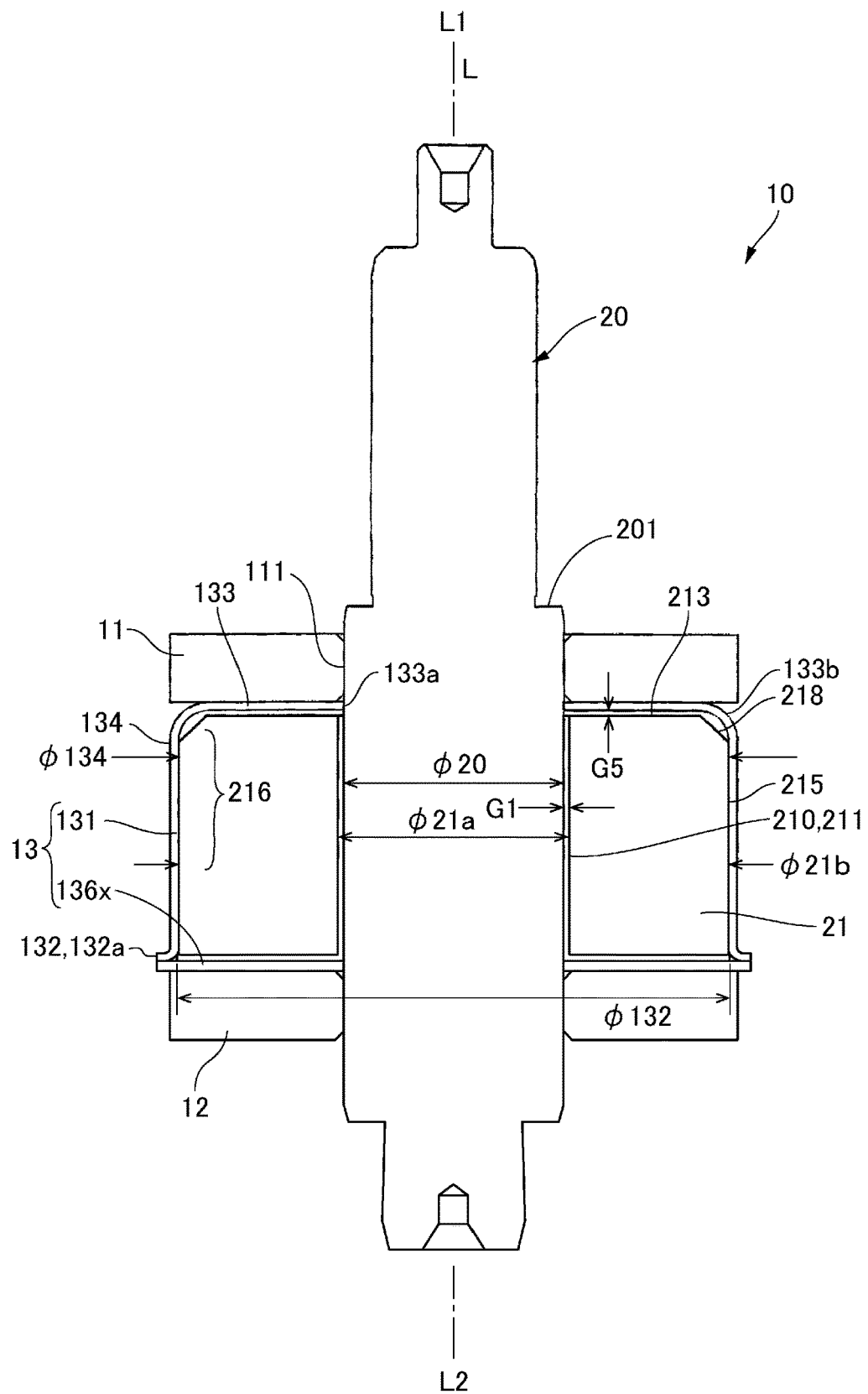
FIG. 13 is an explanatory view of the rotor according to another embodiment of the present invention.

FIG. 13 is an explanatory view of a rotor 10 according to another embodiment of the present invention. FIG. 13 shows a cross sectional view of the rotor 10 when it is cut along the axis L. In the above embodiment, the first holder 131 and the second holder 136 used for the magnet holder 13 were both cup-shaped, but as shown in FIG. 13, in the present embodiment, only one holder is cup-shaped and the other is flat plate-shaped. More specifically, in the magnet holder 13, the first holder 131 includes the annular first bottom plate portion 133 covering the magnet 21 from the one side L1, and the cylindrical first body portion 134 protruding from the first bottom plate portion 133 to the other side L2 and covering the outer peripheral surface of the magnet 21, and the magnet 21 is press-fitted into the first body portion 134. A second holder 136x is flat plate-shaped and is joined to the first end 132, which is an end on the other side L2 of the first body portion 134, by welding or the like. Here, the inner diameter $\phi$ 132 of the first end 132 is larger than the outer diameter $\phi$ 21b of the magnet 21. In addition, in the present embodiment, the magnet 21 has a dimension smaller in the axis L direction than the aspect shown in FIG. 4 and the like. For example, the dimension in the axis L direction of the magnet 21 is smaller than the outer diameter dimension (diameter) of the magnet 21. Accordingly, press-fitting of the magnet 21 into the first body portion 134 is easy.

In the present embodiment, the first end 132 includes the first flange portion 132a curved to the outer side in the radial direction from the first body portion 134, and the first flange portion 132a and the second holder 136x are joined by welding.

If the improvement examples 1 and 2 are applied to the first flange portion 132a of the first holder 131 for the rotor 10 with such configuration, the first flange portion 132a and the second holder 136x are brought into a state of contact with each other over the entire circumference, so that joining by welding or the like is easy. If the improvement examples 3 and 4 are applied to the first flange portion 132a of the first holder 131, the load can be absorbed by deformation of the first bottom plate portion 133.

Another Embodiment

In the above embodiment, the one side L1 of the axis L direction was the output side and the other side L2 of the axis L direction was the anti-output side, but the present invention may be applied when the one side of the axis L direction is the anti-output side and the other side of the axis L direction is the output side.

In the above embodiment, the magnet holder 13 has a structure in which components of the same shape are arranged as the first holder 131 and the second holder 136 in opposite directions in the axis L direction. This is not limiting, and the lengths (heights) of the first holder 131 and the second holder 136 may be different.

INDUSTRIAL APPLICABILITY

In the present invention, the first holder covering the first portion on the one side in the axial direction and the second holder covering the second portion on the other side in the axial direction in the outer peripheral surface of the magnet are provided. Therefore, even if the magnet is damaged when the rotor rotates at a high speed, scattering of fragments (a part of the magnet) can be suppressed by the first holder and the second holder. In addition, since the magnet is covered by the first holder and the second holder, the magnet can be covered more easily than a case where the magnet is covered by a single pipe. Further, the magnet is press-fitted into the first body portion of the first holder and the second body portion of the second holder, and since the inner diameter of the first end of the first body portion and the inner diameter of the second end of the second body portion are larger than the outer diameter of the magnet, press-fitting is easy and joining of the first end and the second end is easy.

In the present invention, the first holder covering the magnet from the one side in the axial direction and the annular second holder covering the magnet from the other side in the axial direction are provided. Therefore, even if the magnet is damaged when the rotor rotates at a high speed, scattering of fragments (a part of the magnet) can be suppressed by the first holder and the second holder. In addition, the magnet is press-fitted into the first body portion of the first holder, and since the inner diameter of the first end of the first body portion is larger than the outer diameter of the magnet, press-fitting is easy and joining of the first end and the second holder is easy.

The invention claimed is:

1. A rotor comprising:
a rotating shaft;
a magnet in a cylindrical shape, having a through hole through which the rotating shaft passes;
a first holder, including:
 a first bottom plate portion in an annular shape, covering the magnet from one side in an axial direction of the rotating shaft, and
 a first body portion in a cylindrical shape, projecting from the first bottom plate portion to the other side in the axial direction and covering a first portion on the one side in an outer peripheral surface of the magnet;
a second holder, including:
 a second bottom plate portion in an annular shape, covering the magnet from the other side, and
 a second body portion in a cylindrical shape, projecting from the second bottom plate portion to the one side and covering a second portion on the other side in the outer peripheral surface of the magnet,
a first support plate which is fixed to the rotating shaft and is overlapped with the first holder from the one side; and
a second support plate which is fixed to the rotating shaft and is overlapped with the second holder from the other side; wherein
the magnet is press-fitted into the first body portion and the second body portion;
a first end, which is an end on the other side of the first body portion, and a second end, which is an end on the one side of the second body portion, are joined; and
an inner diameter of the first end and an inner diameter of the second end are larger than an outer diameter of the magnet;
a gap is provided between an inner peripheral surface of the through hole of the magnet and an outer peripheral surface of the rotating shaft;
a gap is provided between a first end surface, which is an end surface on the one side of the magnet, and the first bottom plate portion;
a gap is provided between a second end surface, which is an end surface on the other side of the magnet, and the second bottom plate portion; and
the first bottom plate portion of the first holder and the first support plate are joined, and the second bottom plate portion of the second holder and the second support plate are joined and thereby, the magnet press-fitted into the first body portion of the first holder and the second body portion of the second holder is fixed to the rotating shaft through the first support plate and the second support plate.

2. The rotor according to claim 1, wherein
the first end includes a first flange portion curved to an outer side in a radial direction from the first body portion;
the second end includes a second flange portion curved to an outer side in the radial direction from the second body portion; and
the first flange portion and the second flange portion are joined.

3. The rotor according to claim 2, wherein
the first flange portion and the second flange portion are joined by welding over an entire circumference.

4. The rotor according to claim 3, wherein
the first body portion and the second body portion are curved to an inner side in the radial direction at a middle portion in the axial direction of each of the first body portion and the second body portion.

5. The rotor according to claim 3, wherein a space between the first flange portion and the second flange portion is filled by a molten portion during welding.

6. The rotor according to claim 2, wherein the first flange portion is elastically deformed to the one side by contact with the second holder.

7. The rotor according to claim 6, wherein in the first flange portion, a middle portion in the radial direction is brought into contact with the second holder; and
a tip end portion on the outer side in the radial direction from the middle portion of the first flange portion is warped toward the one side.

8. The rotor according to claim 6, wherein the first bottom plate portion includes:
   a circular region, located at a center side of the radial direction; and
   an annular region, connecting the circular region to the first body portion,
   wherein the circular region is located on a side opposite to the second holder from the annular region.

9. The rotor according to claim 8, wherein a space between the circular region and the annular region is a step portion.

10. The rotor according to claim 8, wherein the annular region is an inclined surface inclined diagonally to the circular region.

11. The rotor according to claim 1, wherein the magnet is a sintered magnet.

12. A motor comprising:
a rotor according to claim 1; and
a stator, facing the rotor.

13. A rotor comprising:
a rotating shaft;
a magnet in a cylindrical shape, having a through hole through which the rotating shaft passes;
a first holder, including:
   a first bottom plate portion in an annular shape, covering the magnet from one side in an axial direction of the rotating shaft, and
   a first body portion in a cylindrical shape, projecting from the first bottom plate portion to the other side in the axial direction and covering an outer peripheral surface of the magnet;
a second holder in an annular shape, covering the magnet from the other side,
a first support plate which is fixed to the rotating shaft and is overlapped with the first holder from the one side; and a second support plate which is fixed to the rotating shaft and is overlapped with the second holder from the other side; wherein
the magnet is press-fitted into the first body portion;
a first end, which is an end on the other side of the first body portion is joined to the second holder;
an inner diameter of the first end is larger than an outer diameter of the magnet;
a gap is provided between an inner peripheral surface of the through hole of the magnet and an outer peripheral surface of the rotating shaft;
a gap is provided between a first end surface, which is an end surface on the one side of the magnet, and the first bottom plate portion;
a gap is provided between a second end surface, which is an end surface on the other side of the magnet, and the second holder;
the first bottom plate portion of the first holder and the first support plate are joined, and the second holder and the second support plate are joined and thereby, the magnet pressfitted into the first body portion of the first holder is fixed to the rotating shaft through the first support plate and the second support plate.

14. The rotor according to claim 13, wherein the first end has a first flange portion curved to an outer side in a radial direction from the first body portion; and
the first flange portion and the second holder are joined.

15. A manufacturing method of a rotor, wherein the rotor includes:
a rotating shaft;
a magnet in a cylindrical shape, having a through hole through which the rotating shaft passes;
a first holder, including: a first bottom plate portion in an annular shape, covering the magnet from one side in an axial direction of the rotating shaft, and a first body portion in a cylindrical shape, projecting from the first bottom plate portion to the other side in the axial direction and covering a first portion on the one side in an outer peripheral surface of the magnet; and
a second holder, including: a second bottom plate portion in an annular shape, covering the magnet from the other side, and a second body portion in a cylindrical shape, projecting from the second bottom plate portion to the one side and covering a second portion on the other side in the outer peripheral surface of the magnet,
in the manufacturing method of the rotor,
an inner diameter of the first body portion and the inner diameter of the second body portion are made smaller than an outer diameter of the magnet at least in a part of the axial direction,
an inner diameter of a first end, which is an end on the other side of the first body portion, and an inner diameter of a second end, which is an end on the one side of the second body portion, are made larger than the outer diameter of the magnet,
wherein the manufacturing method of the rotor comprises:
a first step of fixing the first holder to the rotating shaft;
a second step of press-fitting the first portion of the magnet into the first body portion;
a third step of fixing the second holder to the rotating shaft so that the second portion of the magnet is press-fitted into the second body portion; and
a fourth step of joining the first end and the second end, wherein
in the first step, the first holder is fixed to the rotating shaft by fixing an annular first support plate overlapping the first holder from the one side to the rotating shaft; and
in the third step, the second holder is fixed to the rotating shaft by fixing an annular second support plate overlapping the second holder from the other side to the rotating shaft.

16. The manufacturing method of a rotor according to claim 15, wherein
the first end includes a first flange portion curved to an outer side in a radial direction from the first body portion;
the second end includes a second flange portion curved to the outer side in the radial direction from the second body portion; and in the fourth step, the first flange portion and the second flange portion are joined.

17. The manufacturing method of a rotor according to claim 16, wherein
in the fourth step, the first flange portion and the second flange portion are joined by welding over an entire circumference.

18. The manufacturing method of a rotor according to claim 17, wherein
in the fourth step, the first flange portion and the second flange portion are joined by laser welding by emitting a laser beam from a direction diagonally inclined to the axial direction.

19. The manufacturing method of a rotor according to claim 17, wherein
after the third step and before the fourth step, a load in a direction in which the first body portion and the second body portion get close to each other in the axial direction is applied to narrow a gap between the first flange portion and the second flange portion.

20. The manufacturing method of a rotor according to claim 19, wherein
when the fourth step is executed, a gap between the first flange portion and the second flange portion is narrower than a protruding dimension of the first flange portion from the first body portion to the outer side in the radial direction and a protruding dimension of the second flange portion from the second body portion to the outer side in the radial direction.

21. The manufacturing method of a rotor according to claim 19, wherein
when the fourth step is executed, a gap between the first flange portion and the second flange portion is narrower than a thickness of the first flange portion and a thickness of the second flange portion.

22. The manufacturing method of a rotor according to claim 19, wherein
the first flange portion and the second flange portion are elastically deformed by applying a load in a direction in which the first body portion and the second body portion get close to each other in the axial direction, and
the first flange portion and the second flange portion are brought into contact with each other over the entire circumference.

23. The manufacturing method of a rotor according to claim 22, wherein
when a load in a direction in which the first body portion and the second body portion get close to each other in the axial direction is applied, a distance between the first bottom plate portion and the second bottom plate portion is narrowed to a target value.

24. The manufacturing method of a rotor according to claim 17, wherein
in the fourth step, the first flange portion and the second flange portion are melted so that a space between the first flange portion and the second flange portion is filled.

25. The manufacturing method of a rotor according to claim 15, wherein
the first step is executed in a state where the first support plate is joined to the first bottom plate portion; and
the third step is executed in a state where the second support plate is joined to the second bottom plate portion.

* * * * *